United States Patent [19]

Kobayashi et al.

[11] 4,256,376
[45] Mar. 17, 1981

[54] ELECTRO-OPTICAL DISPLAY ELEMENT

[75] Inventors: Shunsuke Kobayashi, Tokyo; Akira Miyaji; Yoshio Nara, both of Kawasaki, all of Japan

[73] Assignee: Nippon Kogaku K.K., Tokyo, Japan

[21] Appl. No.: 51,881

[22] Filed: Jun. 25, 1979

[51] Int. Cl.³ .............................................. G02F 1/133
[52] U.S. Cl. .................................... 350/336; 340/765
[58] Field of Search ............... 350/336, 334; 340/765, 340/763, 756

[56] References Cited

U.S. PATENT DOCUMENTS

| | | | |
|---|---|---|---|
| 3,831,166 | 8/1974 | DeNardo | 350/336 X |
| 4,132,984 | 1/1979 | Gross | 350/336 |
| 4,188,626 | 2/1980 | Frantz et al. | 350/336 X |

OTHER PUBLICATIONS

*Electronics,* "Multiplexing Liquid Crystal Displays", pp. 113–121, May 25, 1979.

*Primary Examiner*—Edward S. Bauer
*Attorney, Agent, or Firm*—Fitzpatrick, Cella, Harper & Scinto

[57] ABSTRACT

An electro-optical display element for a multiplexing system has a first and a second electrode substrate opposed to each other and an electrically responsive optical member provided between the two electrode substrates. Each of the two electrode substrates has combinations of ten segments, which are, in order from above, first, second and third lateral segments juxtaposed, a longitudinal upper left segment, upper middle segment and upper right segment juxtaposed between the first segment and the second segment, and a longitudinal lower left segment, lower middle segment, lower right segment juxtaposed between the second and third segments and a point segment for displaying the decimal point. The first electrode substrate has a first, a second and a third signal terminal. The second electrode substrate has a first, a second and a third scanning terminal. The signal terminals and the scanning terminals are specifically connected.

4 Claims, 8 Drawing Figures

ELECTRO-OPTICAL DISPLAY ELEMENT

BACKGROUND OF THE INVENTION

1. Field of the Invention

This invention relates to an electro-optical display element such as liquid crystal using a multiplexing system.

2. Description of the Prior Art

As an electro-optical display element effecting the matrix drive, there has been known the 8-segment construction which comprises "8"-shaped seven segment and one segment for the decimal point. However, the display effected by such element has been limited to numerals and a few alphabetical letters and the form of the display has been less legible where the character to be displayed is "4" for example.

The matrix-addressed display system using the 4×2 matrix or the 3×3 matrix is known, but it has been difficult with such system to increase the number of segments to thereby increase the display content or to make the form of the display legible enough. Particularly, where liquid cryslate are used, the duty factor (duty cycle) cannnot be rendered smaller than ¼ due to the responsive characteristic thereof and it is impossible to use a large matrix to effect the multiplexing.

SUMMARY OF THE INVENTION

It is an object of the present invention to provide an electro-optical display element of the multiplexing type which can effect a greater numer of more legible displays be a relatively simple matrix drive.

The electro-optical display element using the multiplexing system according to the present invention has two new longitudinal segments in the central portion thereof, in addition to the conventional "8"-shaped seven segments, and also have one segment for the decimal point, thus having a total of ten segments, and is driven in a time-divisional fashion by a 3×3 matrix. A primary feature of the present invention lies in the manner of connecting the ten segments electrodes provided on each of two electrode substrates to which the electro-optical substance may respond.

The invention will become more fully apparent from the following detailed description of embodiments thereof taken in conjunction with the accompanying drawings.

DESCRIPTION OF THE PREFERRED EMBODIMENTS

Figure 1:
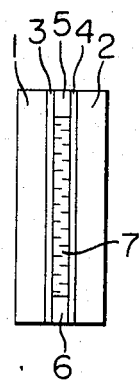
FIG. 1 is a cross-sectional view of an electro-optical element.

FIG. 1 is a cross-sectional view of a general electro-optical display element and the present invention also uses such a construction.

Opposed first and second transparent electrode substrates 3 and 4 are provided between insulative substrates 1 and 2 such as glass or the like, and spacers 5 and 6 for determining the spacing between the two electrode substrates are provided between the two transparent electrode substrates 3 and 4. An electrically responsive optical substance 7 such as liquid crystal or the like fills the space defined by the two electrode substrates 3, 4 and the spacers 5, 6.

Figure 2A:
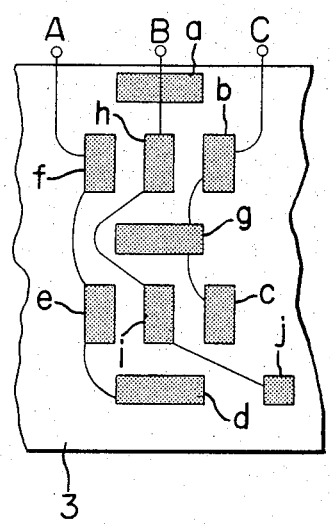
FIGS. 2A and 2B are front views of a first embodiment of the electrode substrates in accordance with the present invention.
Figure 2B:
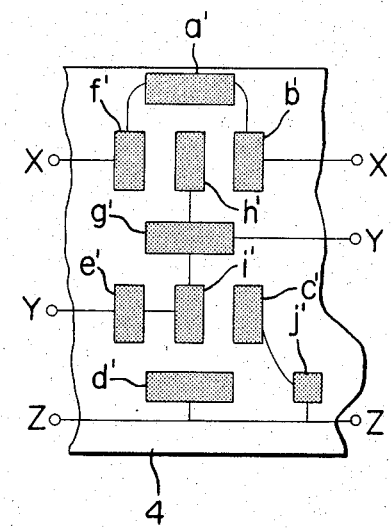

The first and second electrode substrates 3 and 4 are respectively provided with ten segment electrodes a–j and ten segment electrodes a'–j', as shown in FIGS. 2A and 2B. The character is formed by a pair of these ten segment electrodes. On the two electrode substrates 3 and 4, combinations of shown ten segments are provided in a row to display a plurality of characters or numerals. Only one set thereof is shown herein. The combinations of ten segment electrodes provided on the two electrode substrates 3 and 4 each have segment configurations and arrangements equal to each other as shown. More specifically, in order from above, there are first, second and third lateral segments a, g, d, a', g', d' juxtaposed sideways, longitudinal upper left segments f, f', upper middle segments h, h' and upper right segments b, b' juxtaposed lengthwise between the first and second lateral segments a, g, a', g', longitudinal lower left segments e, e', lower middle segments i, i', and lower right segments c, c' juxtaposed lengthwise between the second and third lateral segments g, d, g', d', and point segments j, j' for decimal points.

First, second and third signal terminals A, B and C each for displaying a character are provided on the first electrode substrate 3. First, second and third scanning terminals x, y and z are provided on the second electrode substrate 4 and these are common terminals for each character to display a plurality of juxtaposed characters. As shown in FIG. 2A, in the first electrode substrate 3, the first signal terminal A is connected to the upper left segment f, the lower left segment e and the third segment d, the second signal terminal B is connected to the first segment a, the upper middle segment h, the lower middle segment i and the point segment j, and the third signal terminal C is connected to the upper right segment b, the second segment g and the lower right segment c. On the other hand, as shown in FIG. 2B, in the second electrode substrate 4, the first scanning terminal X is connected to the upper left segment f', the first segment a' and the upper right segment b' the second scanning terminal Y is connected to the lower left segment e', the lower middle segment i', the second segment g' and the upper middle segment h', and the third scanning terminal Z is connected to the third segment d', the point segment j' and the lower right segment c'.

The three signal terminals A. B. C and three scanning terminals X. Y, Z respectively correspond to the column and row of 3×3 matrix, and selection or non-selection signals are applied as input to the three signal terminals and three scanning terminals by unshown multiplexing signal control means of 3×3 matrix system, whereby a desired character may be displayed.

Description will now be made of the display method of the electro-optical display element of the present embodiment having the electrode segment pattern as shown in FIG. 2.

For example, when a selection signal is being applied to the scanning terminal Y, a selection signal is applied to the signal terminal B and a non-selection signal is applied to the other signal terminals A and C, and when a selection signal is being applied to the scanning terminal X or Z, a non-selection signal is applied to all of the signal terminals A, B and C; in such a case, only the electro-optical substance between the h, i signal segment electrodes and the h', i' scanning segment electrodes responds to display a numeral "1". To cause a numeral "2" to be displayed, a selection signal is applied to the signal terminals B and C and a non-selection signal is applied to the signal terminal A when a selection signal has been applied to the scanning terminal A; a selection signal is applied to the signal terminals A and C and a non-selection signal is applied to the signal terminal B when a selection signal has been applied to the scanning terminal Y; and a selection signal is applied to the signal terminal A and a non-selection signal is applied to the signal terminals B and C when a selection signal has been applied to the scanning terminal Z. By this, the electro-optical substance between the a, b, g, e, d signal segment electrodes and the a', b', g', e', d' scanning segment electrodes responds to display "2".

Figure 3:
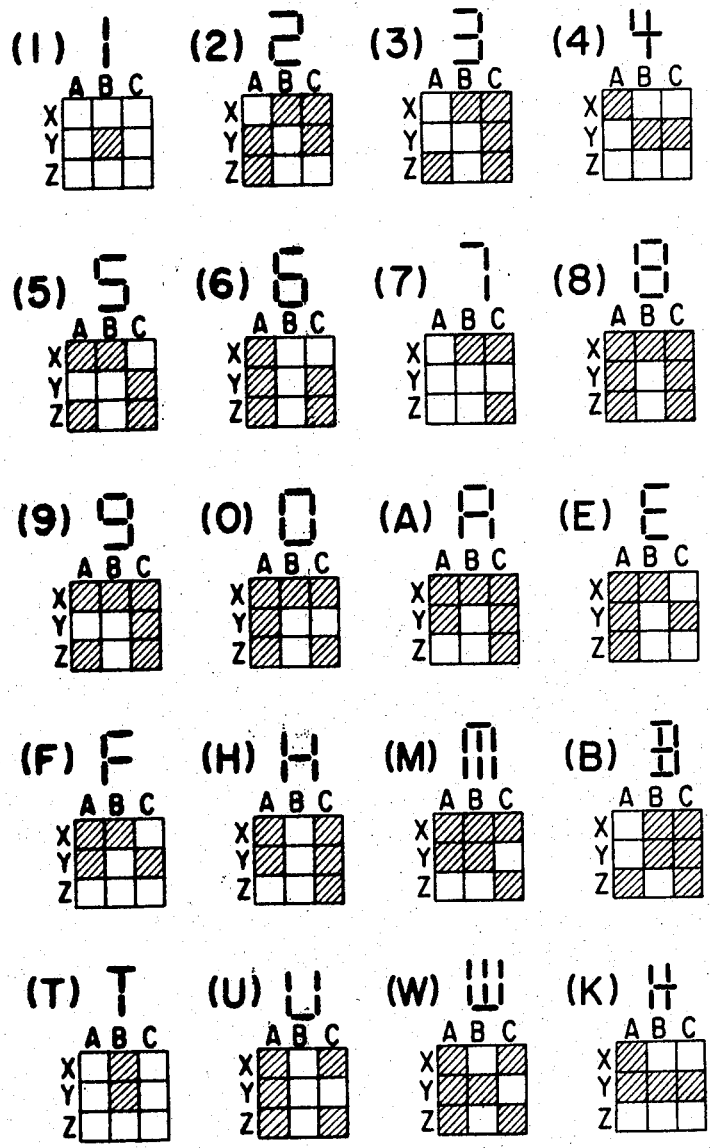
FIG. 3 shows the relationships between signals applied to the scanning terminals and the signal terminals in the first embodiment.

To visually clearly show these relationships, the relations between signals applies to the scanning terminals X, Y, Z and the signal terminals A, B, C when numerals "1"-"0" and alphabetical letters AEFHMBRTUWK are to be displayed are shown as 3 × 3 matrix in FIG. 3. In FIG. 3 the hatching lying at the point of intersection of the matrix shows that a selection signal is applied to each of the signal terminals and the scanning terminal which form the point of intersection, namely, that an electrical signal exceeding a threshold value which induces an optical variation in the electro-optical substance between the segment electrodes determined by that point of intersection is applied.

Alphabetical letters "O", "S" and "R" are respectively displayed in the same manner of numerals "0" and "5" and alphabetical letter "A".

Figure 4:
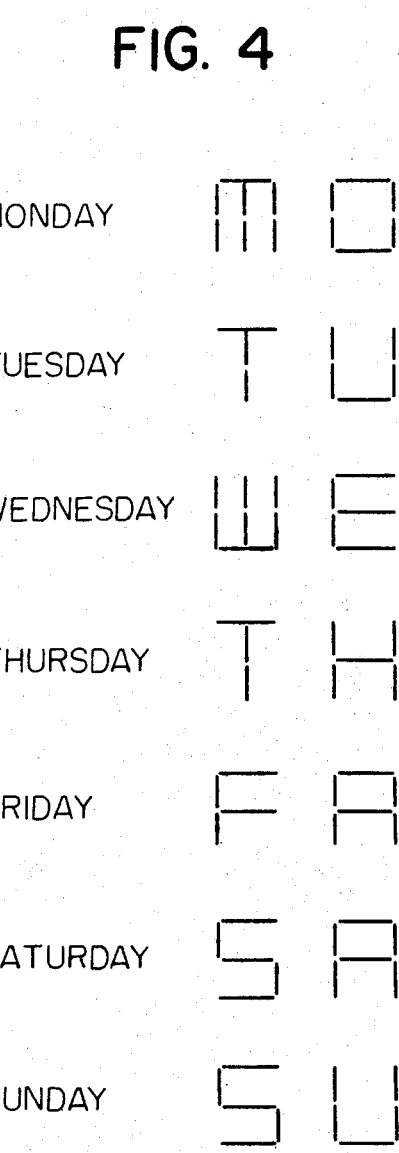
FIG. 4 shows examples of the display of the days of the week.

Particularly, as regards such numerical display, "1" can be displayed at the center of the display element by the presence of the segment elecrodes h-h' and i-i', and "4" is formed by the segment electrodes f-f', h-h', g-g' and i-i' and can be displayed more legibly than the 7-segment display according to the prior art. Also, alphabetical display necessary for the display of the days of the week can be effected in a sufficiently legible form as shown in FIG. 4. Display in such a legible form and numerous displays could not be accomplished at all by the 3×3 matrix display of the prior art.

Figure 5A:
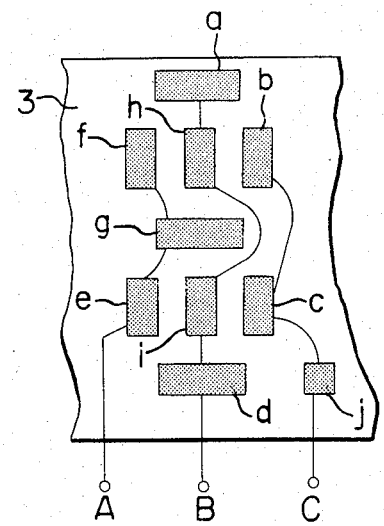
FIGS. 5A and 5B are front views of a second embodiment of the electrode substrate.
Figure 5B:
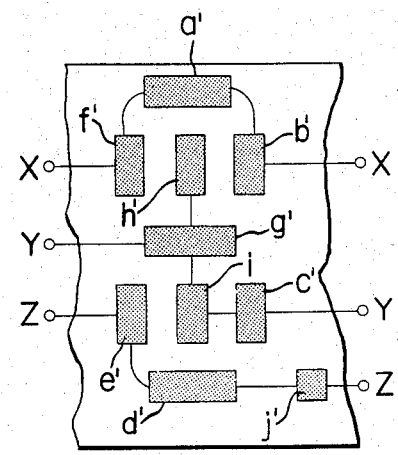

Next, the construction of the first and second electrode substrates 3 and 4 according to another embodiment of the present invention is shown in FIGS. 5A and 5B.

In this embodiment, the ten segment electrodes provided on each of the first electrode substract 3 and the second elecrode substrate 4 are of the same form and arrangement as those in the previously described embodiment, and again have three signal terminals A, B, C and three scanning terminals X, Y, Z but differ in the manner of connection between the segment electrodes and the terminals. In the first electrode substrate 3, the first signal terminal A is connected to the upper left segment f, the second segment g and the lower left segment e, the second signal terminal B is connected to the first segment a, the upper middle segment h, the lower middle segment i and the third segment d, and the third signal terminal C is connected to the upper right segment b, the lower right segment C and the point segment j. On the other hand, in the second electrode substrate 4, the first scanning terminal X is connected to the upper left segment f', the first segment a' and the upper right segment b', the second scanning terminal Y is connected to the second segment g', the upper middle segment h', the lower middle segment i' and the lower right segment c', and the third scanning terminal Z is connected to the lower left segment e', the third segment d' and the point segment j'.

Figure 6:
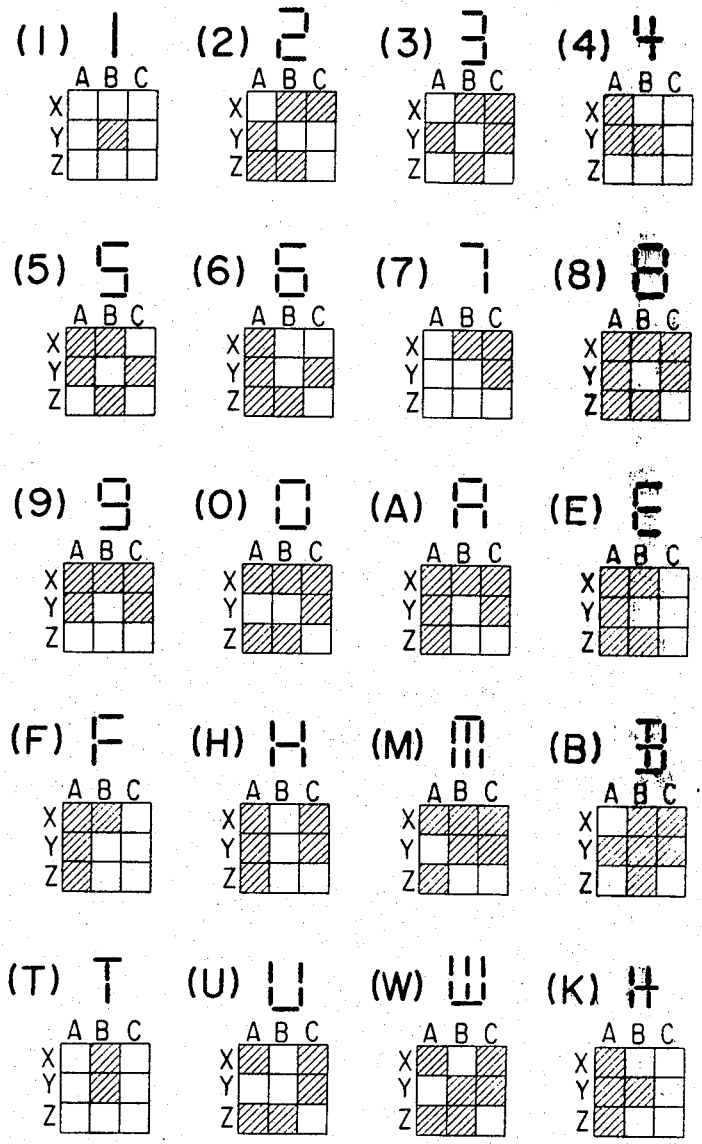
FIG. 6 shows the relationships between signals applied to the scanning terminals and the signal terminals in the second embodiment.

In the construction of the present embodiment, like the previously described embodiment, it is possible to display any desired character by unshown multiplexing signal control means of the 3×3 matrix system, but the present embodiment differs from the previous embodiment in the manner of application of signals to the signal terminals and the scanning terminals. The relationships between the input signals to the signal terminals and the scanning terminals for representing various characters in the present embodiment are shown by 3×3 matrix in FIG. 6, as in FIG. 3.

The connections between the segment electrodes and the signal and scanning terminals in the second embodiment shown in FIG. 5 differ apparently from those in the first embodiment shown in FIG. 2, but as far as the second electrode substrate 4 is concerned, the connection between each segment electrode and each scanning terminal is substantially identical to that in FIG. 2. This is clear from the fact that the second electrode substrate 4 of one embodiment, if reversed, becomes duplicate with the construction of the second electrode substrate of the other embodiment. As regards the first electrode substrate 3, as will be seen by reversing FIG. 5A which shows the first electrode substrate 3 of the second embodiment and overlapping the same with FIG. 2A showing the first embodiment, it differs only in that the third segment d is connected to the second signal terminal B and the point segment j to the first signal terminal A and in the other points, it is substantially identical to the first electrode substrate of the first embodiment. This is because the first and third signal terminals A and C in the second embodiment can respectively be regarded as the third and first signal terminals C and A in the first embodiment. Thus, the two embodiments are essentially of the same construction with the only exception that in the first electrode substrate 3, the connection between the third segment d and the point segment j is changed in place.

In each of the foregoing embodiments, on the assumption of the case where the display elements are juxtaposed sideways as in the conventional display device, XYZ are defined as scanning terminals and ABC are defined as signal terminals, whereas the reverse may be taken if the display elements are juxtaposed lengthwisely.

Since the electro-optical display element of the present invention as described above is of the 3×3 matrix drive type, the duty factor can be rendered as great as ⅓ and this is preferable to the multiplexing of the substance such as liquid crystal which utilizes the electro-optical effect. According to the present invention, in spite of the 3×3 matrix dirve, apparently ten segments can be driven and B, K, M, W, etc. can also be displayed and thus, a greater variety of displays than in the prior art can be effected and the display is visually more legible than that according to the prior art.

We claim:

1. An electro-optical display element of the multiplexing type comprising:
   (a) a first and a second electrode substrate opposed to each other, each of said electrode substrates having combinations consisting of, in order from above, first, second and third lateral segments juxtaposed, a longitudinal upper left segment, upper middle segment and upper right segment juxtaposed between said first and second segments, and a longitudinal lower left segment, lower middle segment and lower right segment juxtaposed between said second and third segments and a point segment for displaying the decimal point;
   (b) an optical member provided between said two electrode substrates and electrically responsive;
   (c) a first, a second and a third signal terminal provided on said first electrode substrate, said first signal terminal being connected to said upper left segment, said lower left segment and one of said third segment and said point segment, said second signal terminal being connected to said first segment, said upper middle segment, said lower middle segment and the other of said third segment and said point segment, said third signal terminal being connected to said upper right segment, said second segment and said lower right segment; and (d) a first, a second and a third scanning terminal provided on said second electrode substrate, said first scanning terminal being connected to said upper left segment, said first segment and said upper right segment, said second scanning terminal being connected to said lower left segment, said lower middle segment, said second segment and said upper middle segment, said third scanning terminal being connected to said third segment, said lower right segment and said point segment.

2. The element according to claim 1, wherein said two electrode substrates have a plurality of combinations consisting of said ten segments and in a plurality of juxtaposed sets, one of said signal terminals and said scanning terminals is common to each set.

3. The element according to claim 1 or 2, wherein said electro-optical member is liquid crystal.

4. The element according to claim 3, wherein insulative substrates are provided on the outer sides of said two electrode substrates.

* * * * *

UNITED STATES PATENT AND TRADEMARK OFFICE
CERTIFICATE OF CORRECTION

PATENT NO. : 4,256,376

DATED : March 17, 1981

INVENTOR(S) : SHUNSUKE KOBAYASHI, et al.

It is certified that error appears in the above—identified patent and that said Letters Patent is hereby corrected as shown below:

On the title page, after
"[22] Filed:    Jun. 25, 1979"    insert

--[30]    Foreign Application Priority Data

Jun. 28, 1978 [JP]  Japan..............53/78234--

Column 1, line 24, change "cryslate" to --crystals--;

line 39, change "have" to --has--;

line 43, change "segments" to --segment--.

Column 3, line 18, change "A" to --X--;

line 30, change "applies" to --applied--.

Signed and Sealed this

Sixteenth Day of June 1981

[SEAL]

Attest:

RENE D. TEGTMEYER

*Attesting Officer*   *Acting Commissioner of Patents and Trademarks*